(12) United States Patent
Noh et al.

(10) Patent No.: US 9,048,976 B2
(45) Date of Patent: Jun. 2, 2015

(54) APPARATUS AND METHOD FOR TRANSMITTING REFERENCE SIGNALS IN WIRELESS COMMUNICATION SYSTEM

(75) Inventors: Min Seok Noh, Anyang-si (KR); Jae Hoon Chung, Anyang-si (KR); Moon Il Lee, Anyang-si (KR); Seung Hee Han, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 222 days.

(21) Appl. No.: 13/379,635

(22) PCT Filed: Jun. 21, 2010

(86) PCT No.: PCT/KR2010/004004
§ 371 (c)(1),
(2), (4) Date: Dec. 20, 2011

(87) PCT Pub. No.: WO2010/151015
PCT Pub. Date: Dec. 29, 2010

(65) Prior Publication Data
US 2012/0106493 A1 May 3, 2012

Related U.S. Application Data

(60) Provisional application No. 61/218,991, filed on Jun. 22, 2009, provisional application No. 61/249,601, filed on Oct. 8, 2009, provisional application No. 61/294,794, filed on Jan. 13, 2010, provisional application No. 61/298,892, filed on Jan. 27, 2010, provisional application No. 61/305,080, filed on Feb. 16, 2010.

(51) Int. Cl.
*H04W 4/00* (2009.01)
*H04L 5/00* (2006.01)
*H04J 13/00* (2011.01)

(52) U.S. Cl.
CPC ............ *H04L 5/0007* (2013.01); *H04J 13/0055* (2013.01); *H04L 5/0048* (2013.01)

(58) Field of Classification Search
CPC .......... H04L 25/03006; H04L 47/827; H04W 72/1278; H04W 76/021
USPC .......................... 370/208, 316, 329, 344, 328
See application file for complete search history.

(56) References Cited

U.S. PATENT DOCUMENTS

2008/0025255 A1* 1/2008 Garg et al. ..................... 370/329
2009/0003274 A1* 1/2009 Kwak et al. ................... 370/329

(Continued)

FOREIGN PATENT DOCUMENTS

| KR | 10-2008-0054164 | 6/2008 |
| KR | 10-2009-0031646 | 3/2009 |
| KR | 10-2009-0043173 | 5/2009 |

*Primary Examiner* — Andrew Chriss
*Assistant Examiner* — Romani Ohri
(74) *Attorney, Agent, or Firm* — Lee, Hong, Degerman, Kang & Waimey

(57) ABSTRACT

Provided are a method and apparatus for transmitting reference signals in a wireless communication system. A first set of reference signals and a second set of reference signals are generated and mapped to a first resource block (RB) in accordance with a first reference signal pattern and a second RB which is close to the first RB in accordance with a second reference signal pattern. The first RB and the second RB are transmitted from a base station to user equipment. Each of the first reference signal pattern and the second reference signal pattern is formed of one sub-frame and on RB unit. In addition, resource elements (Rs) to which the first set of reference signals and the second set of reference signals are respectively mapped in accordance with the second reference signal pattern are REs to which the second set of reference signals and the first set of reference signals are respectively mapped in accordance with the first reference signal pattern.

12 Claims, 21 Drawing Sheets

(56) References Cited

U.S. PATENT DOCUMENTS

| | | |
|---|---|---|
| 2009/0080569 A1* | 3/2009 | Han et al. ............... 375/316 |
| 2009/0135803 A1* | 5/2009 | Luo et al. ............... 370/350 |
| 2009/0303946 A1* | 12/2009 | Yokoyama et al. ........... 370/329 |
| 2010/0195566 A1* | 8/2010 | Krishnamurthy et al. .... 370/328 |
| 2010/0272032 A1* | 10/2010 | Sayana et al. ............. 370/329 |
| 2010/0303034 A1* | 12/2010 | Chen et al. ............... 370/329 |
| 2010/0323709 A1* | 12/2010 | Nam et al. ............... 455/450 |
| 2011/0211489 A1* | 9/2011 | Chung et al. ............. 370/252 |
| 2011/0228722 A1* | 9/2011 | Noh et al. ............... 370/315 |

* cited by examiner

APPARATUS AND METHOD FOR TRANSMITTING REFERENCE SIGNALS IN WIRELESS COMMUNICATION SYSTEM

CROSS-REFERENCE TO RELATED APPLICATIONS

This application is a 371 U.S. national stage application of International Application No. PCT/KR2010/004004, filed on Jun. 21, 2010, which claims priority to U.S. Provisional Application Ser. Nos. 61/305,080, filed on Feb. 16, 2010, 61/298,892, filed on Jan. 27, 2010, 61/294,794, filed on Jan. 13, 2010, 61/249,601, filed on Oct. 8, 2009 and 61/218,991 filed on Jun. 22, 2009, the contents of which are incorporated by reference herein in their entirety.

BACKGROUND OF THE INVENTION

1. Field of the Invention

The present invention relates to wireless communications, and more particularly, to a method and an apparatus for transmitting a reference signal in a wireless communication system.

2. Related Art

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gps (gigabits per second) and uplink 500 Mbps (megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

Technology for supporting reliable and high-speed data service includes orthogonal frequency division multiplexing (OFDM), multiple input multiple output (MIMO), and so on. An OFDM system is being considered after the $3^{rd}$ generation system which is able to attenuate the ISI effect with low complexity. The OFDM system converts symbols, received in series, into N (N is a natural number) parallel symbols and transmits them on respective separated N subcarriers. The subcarriers maintain orthogonality in the frequency domain. It is expected that the market for mobile communication will shift from the existing code division multiple access (CDMA) system to an OFDM-based system. MIMO technology can be used to improve the efficiency of data transmission and reception using multiple transmission antennas and multiple reception antennas. MIMO technology includes spatial multiplexing, transmit diversity, beam-forming and the like. An MIMO channel matrix according to the number of reception antennas and the number of transmission antennas can be decomposed into a number of independent channels. Each of the independent channels is called a layer or stream. The number of layers is called a rank.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a reference signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value ĥ using Equation 1 in the case in which a least square (LS) method is used.

$$\hat{h}=y/p=h+n/p=h+\hat{n} \qquad \text{[Equation 1]}$$

The accuracy of the channel estimation value ĥ estimated using the reference signal p is determined by the value ñ. To accurately estimate the value h, the value ñ must converge on 0. To this end, the influence of the value ñ has to be minimized by estimating a channel using a large number of reference signals. A variety of algorithms for a better channel estimation performance may exist.

A UE-specific reference signal is transmitted in a UE-specific manner, which is mostly used for data demodulation. Meanwhile, the LTE rel-9 and LTE-A support dual layer beam-forming, where the LTE-A supports up to eight transmit antennas, attempting improving performance throughput.

SUMMARY OF THE INVENTION

The present invention provides a method and an apparatus for transmitting a reference signal in a wireless communication system.

In an aspect, a method for transmitting a reference signal in a wireless communication system is provided. The method includes generating a first reference signal set and a second reference signal set, mapping the first reference signal set and the second reference signal set to a first resource block (RB) according to a first reference signal pattern, mapping the first reference signal set and the second reference signal set to a second RB, which is consecutive to the first RB, according to a second reference signal pattern, transmitting the first RB and the second RB to a UE, wherein the first reference signal pattern and the second reference signal pattern are a reference signal pattern formed in units of one subframe and one RB, and wherein a resource element onto which the first reference signal set and the second reference signal set are mapped respectively according to the second reference signal pattern corresponds to a resource element onto which the second reference signal set and the first reference signal set are mapped respectively according to the first reference signal pattern. The first reference signal set or the second reference signal set respectively may include a demodulation reference signal (DMRS) for data demodulation for at least one layer. The first reference signal set or the second reference signal set may include DMRS for multiple layers, and wherein the DMRS for multiple layers may be multiplexed in code division multiplexing (CDM) manner. The DMRS for multiple layers may be multiplexed in CDM manner by using an orthogonal code of length 2. The first reference signal set or the second reference signal set respectively may include channel state information reference signal (CSI-RS) for estimating channel status for at least one layer. The CSI-RS may be mapped to orthogonal frequency division multiplexing (OFDM) symbol to which a cell-specific reference signal or DMRS of the long term evolution (LTE) rel-8 system is not mapped. The first reference signal set and the second reference signal set may be mapped being extended to other resource blocks consecutive to the first RB or the second RB according to the first reference signal pattern and the second reference signal pattern. A number of other consecutive resource blocks may be multiple of 2. A number of other consecutive resource blocks may be odd, and wherein transmission power of the first reference signal set and the second reference signal set may be adjusted at the same level. The first reference signal set or the second reference signal set may be mapped with the same subcarrier spacing across the first RB and the second RB.

In another aspect, an apparatus for transmitting a reference signal in a wireless communication system is provided. The apparatus includes a reference signal generator configured for generating a first reference signal set and a second reference signal set, a reference signal mapper configured for mapping the first reference signal set and the second reference signal set to a first resource block (RB) according to a first reference signal pattern and mapping the first reference signal set and the second reference signal set to a second RB, which is consecutive to the first, RB according to a second reference signal pattern, and a radio frequency (RF) unit configured for transmitting the first RB and the second RB, wherein the first reference signal pattern and the second reference signal pattern are a reference signal pattern formed in units of one subframe and one RB, and wherein a resource element onto which the first reference signal set and the second reference signal set are mapped respectively according to the second reference signal pattern corresponds to a resource element onto which the second reference signal set and the first reference signal set are mapped respectively according to the first reference signal pattern.

In another aspect, an apparatus for receiving a reference signal in a wireless communication system is provided. The apparatus includes a radio frequency (RF) unit configured for receiving a reference signal from a base station, and a processor configured for processing the reference signal and performing data modulation and channel estimation, wherein the reference signal are transmitted through a first RB and a second RB consecutive to the first RB, wherein the reference signal are mapped within the first RB according to a first reference signal pattern and are mapped within the second RB according to a second reference signal pattern, and wherein positions of resource elements to which the reference signals are mapped are swapped to each other within the first RB and the second RB according to the first reference signal pattern and the second reference signal pattern. The reference signal may include demodulation reference signal (DMRS) for data modulation. The reference signal may include channel state information reference signal (CSI-RS) for estimating channel status.

A reference signal for multiple layers is transmitted from two or more resource blocks (RBs) with the same transmission power, thereby improving performance of channel estimation.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP ($3^{rd}$ generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
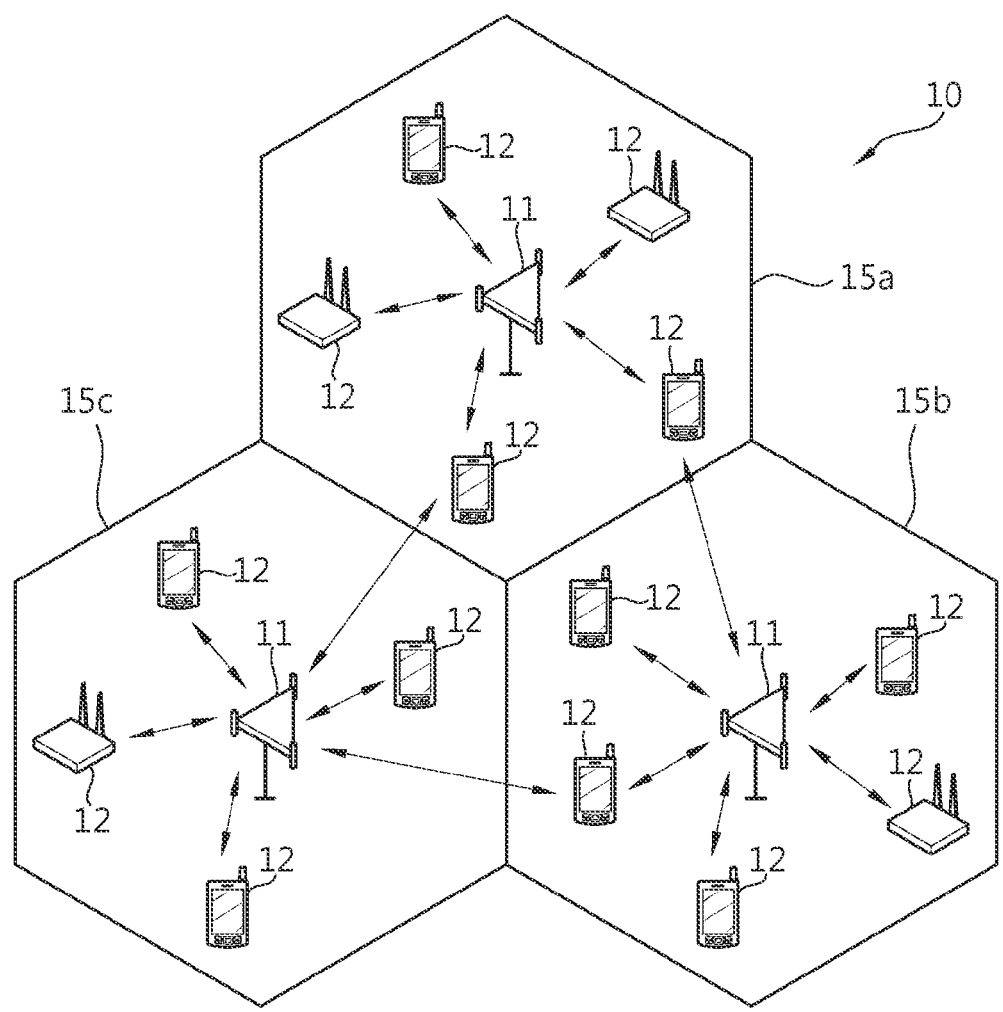
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

Figure 2:
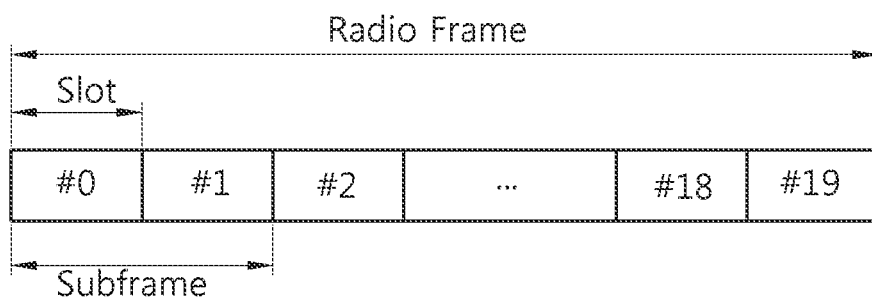
FIG. 2 shows the structure of a radio frame in 3GPP LTE.

FIG. 2 shows the structure of a radio frame in 3GPP LTE. It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03).

Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of OFDM (Orthogonal Frequency Division Multiplexing) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

Figure 3:
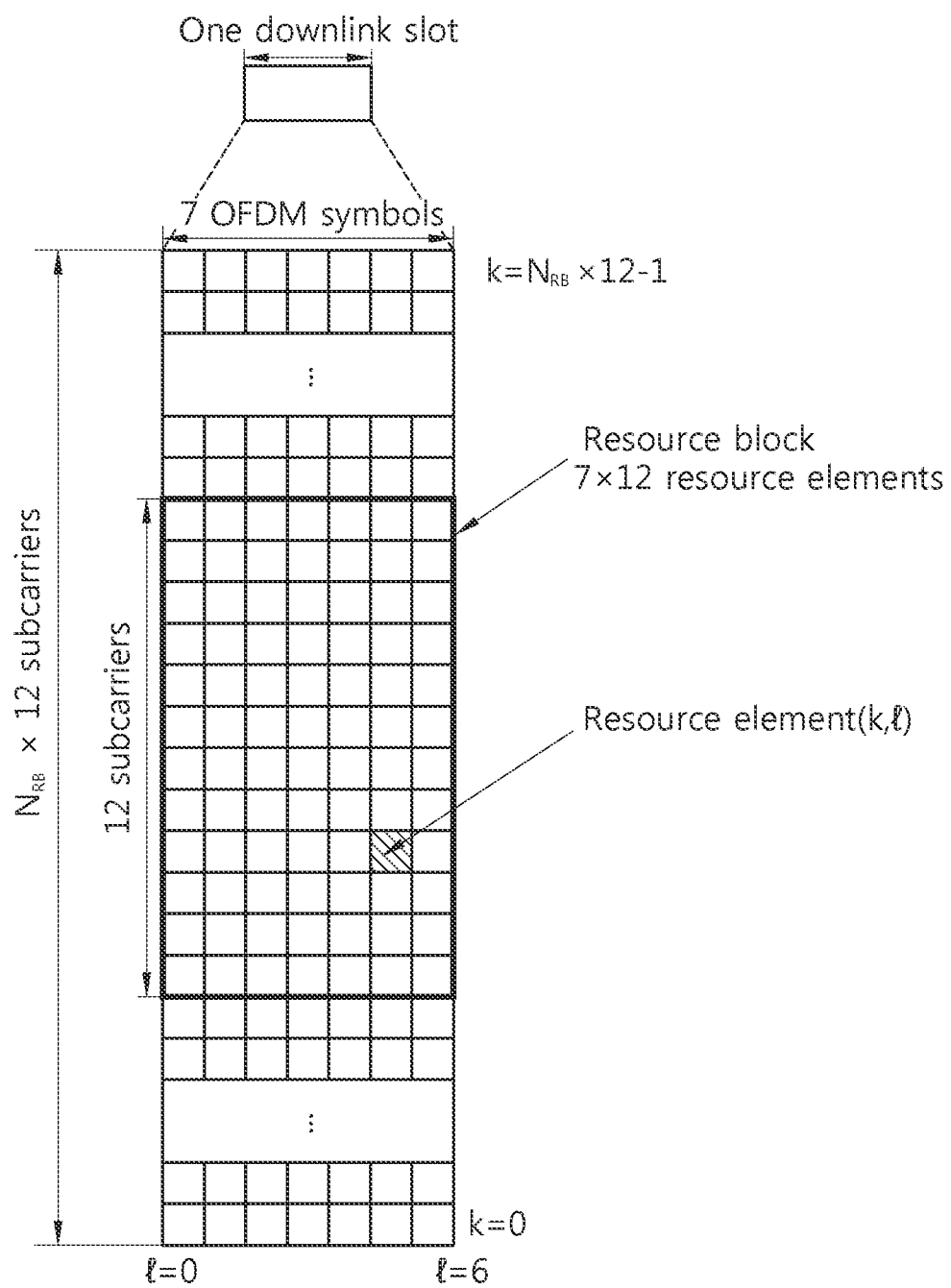
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12 - 1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
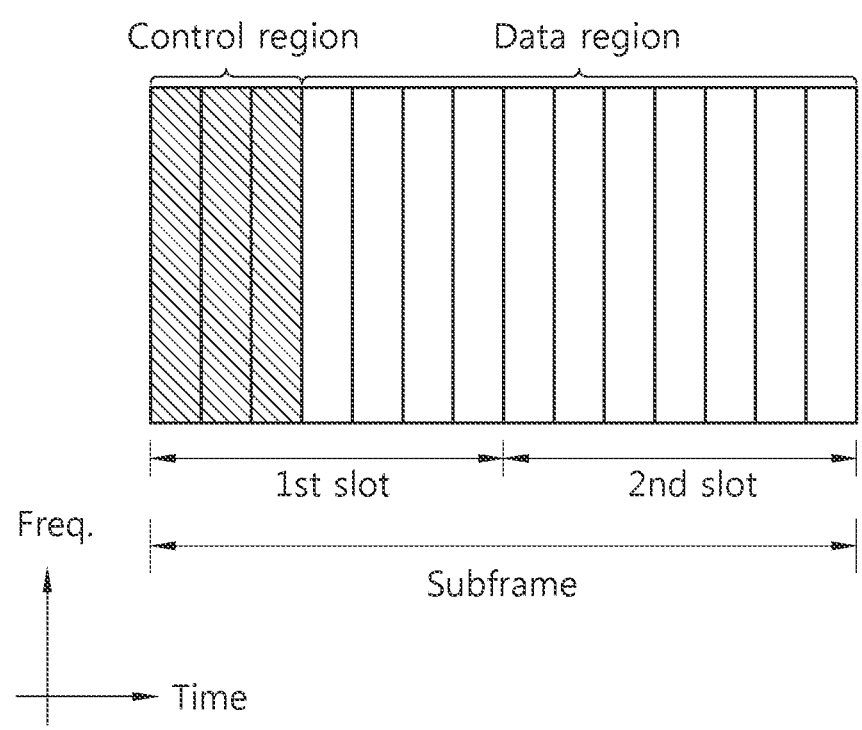
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated. Downlink control channels used in the 3GPP LTE include a physical control format indicator channel (PCFICH), a physical downlink control channel (PDCCH), a physical hybrid-ARQ indicator channel (PHICH), and so on. The PCFICH transmitted in the first OFDM symbol of a subframe carries information about the number of OFDM symbols (that is, the size of a control region) which is used to transmit control channels within the subframe. The PHICH carries an acknowledgement (ACK)/non-acknowledgement (NACK) signal for an uplink hybrid automatic repeat request (HARQ). In other words, an ACK/NACK signal for uplink data transmitted by a user equipment is transmitted on the PHICH. Control information transmitted through the PDCCH is called downlink control information (DCI). The DCI indicates uplink or downlink scheduling information, an uplink transmission power control command for specific user equipment groups, etc.

Figure 5:
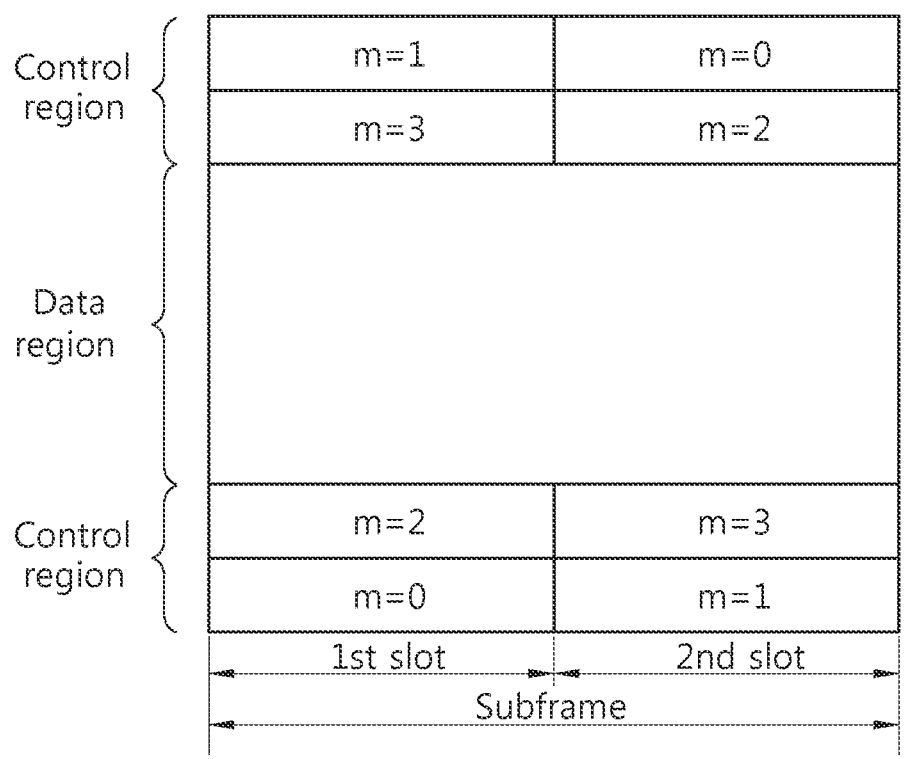
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUSCH) for transmitting data is allocated to the data region. The user equipment does not transmit the PUCCH and the PUSCH simultaneously to maintain a single carrier property. The PUCCH with respect to a UE is allocated by a pair of resource blocks in a subframe. The resource blocks belonging to the pair of resource blocks (RBs) occupy different subcarriers in first and second slots, respectively. This is said that the pair of RBs allocated to the PUCCH are frequency-hopped at the slot boundary.

A reference signal is generally transmitted as a sequence. A reference signal sequence is not particularly limited and a certain sequence may be used as the reference signal sequence. As the reference signal sequence, a sequence generated through a computer based on phase shift keying (PSK) (i.e., a PSK-based computer generated sequence) may be used. The PSK may include, for example, binary phase shift keying (BPSK), quadrature phase shift keying (QPSK), and the like. Or, as the reference signal sequence, a constant amplitude zero auto-correlation (CAZAC) may be used. The CAZAC sequence may include, for example, a Zadoff-Chu (ZC)-based sequence, a ZC sequence with cyclic extension, a ZC sequence with truncation, and the like. Also, as the reference signal sequence, a pseudo-random (PN) sequence may be used. The PN sequence may include, for example, an m-sequence, a sequence generated through a computer, a gold sequence, a Kasami sequence, and the like. Also, a cyclically shifted sequence may be used as the reference signal sequence.

A reference signal can be classified into a cell-specific reference signal (CRS), an MBSFN reference signal, and a user equipment-specific reference signal (UE-specific RS). The CRS is transmitted to all the UEs within a cell and used for channel estimation. The MBSFN reference signal can be transmitted in sub-frames allocated for MBSFN transmission. The UE-specific reference signal is received by a specific UE or a specific UE group within a cell, and may be referred to a dedicated RS (DRS). The DRS is chiefly used by a specific UE or a specific UE group for the purpose of data demodulation.

First, a CRS is described.

Figure 6:
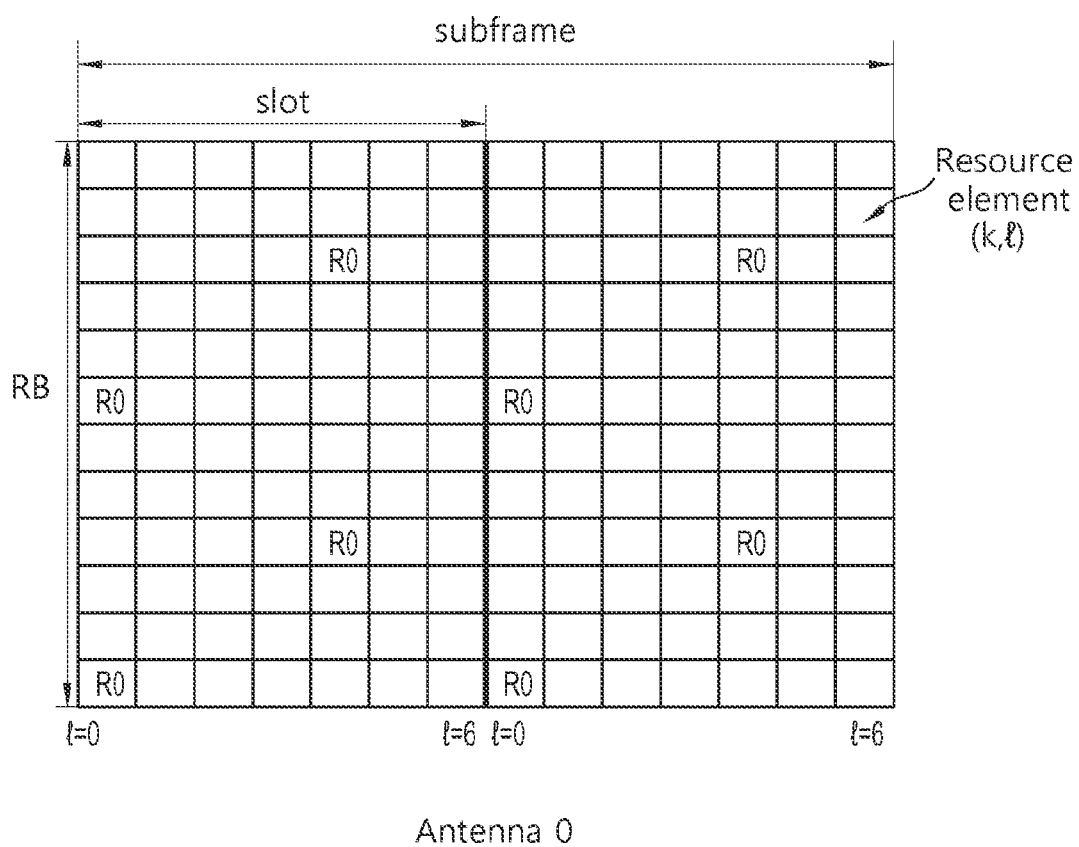
FIGS. 6 to 8 show an exemplary CRS structure.
Figure 7:
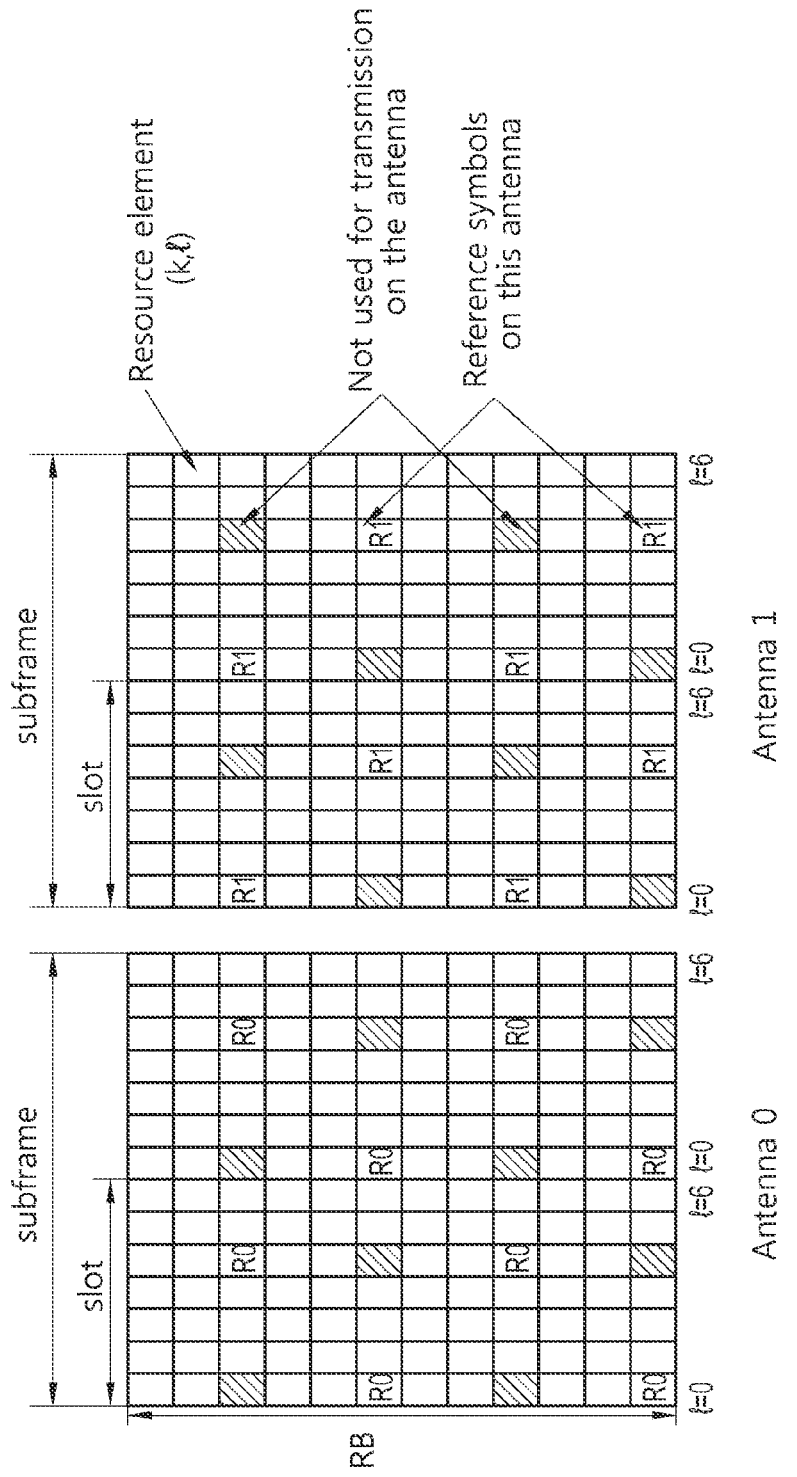
Figure 8:
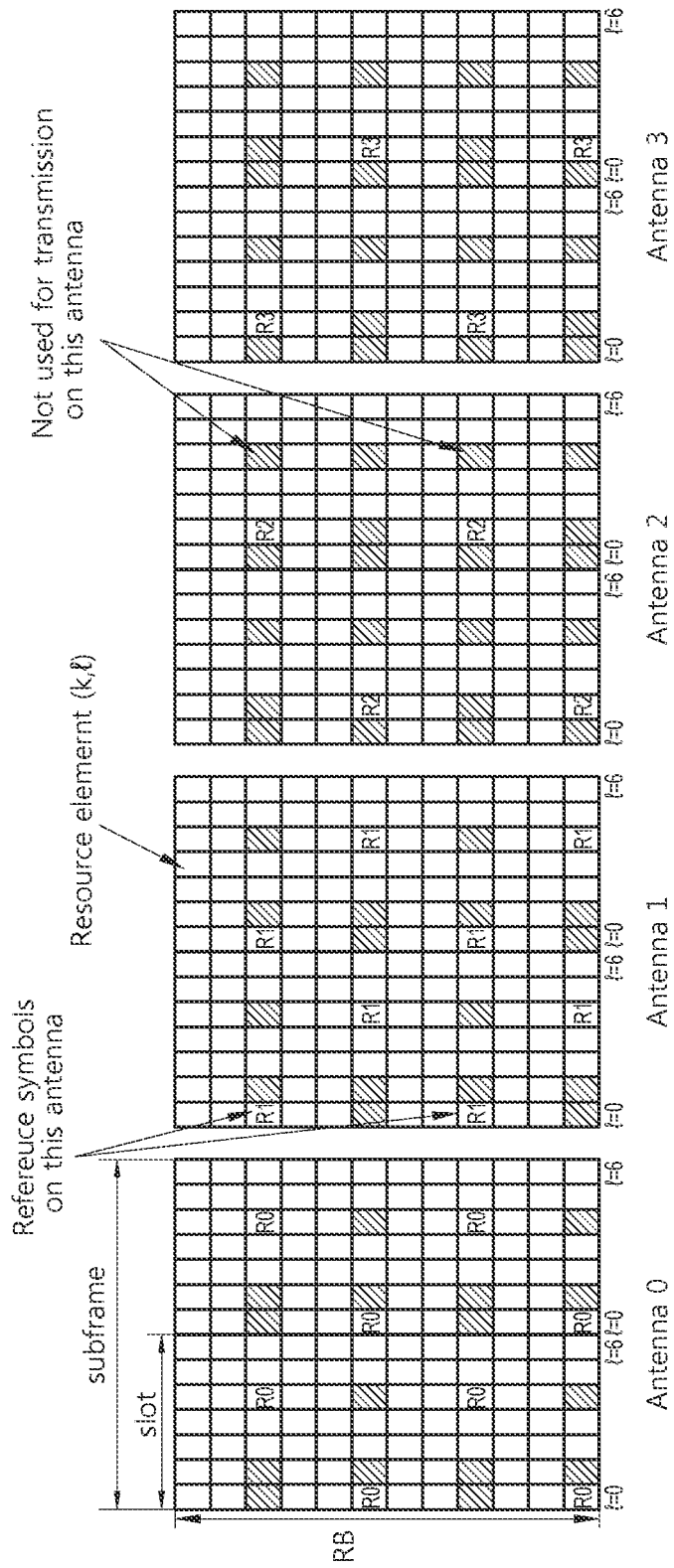

FIGS. 6 to 8 show an exemplary CRS structure. FIG. 6 shows an exemplary CRS structure when a BS uses one antenna. FIG. 7 shows an exemplary CRS structure when a BS uses two antennas. FIG. 8 shows an exemplary CRS structure when a BS uses four antennas. The section 6.10.1 of 3GPP TS 36.211 V8.2.0 (2008-03) may be incorporated herein by reference. In addition, the exemplary CRS structure may be used to support a feature of an LTE-A system. Examples of the feature of the LTE-A system include coordinated multi-point (CoMP) transmission and reception, spatial multiplexing, etc. Furthermore, the CRS maybe used for channel quality estimation, CP detection and time/frequency synchronization.

Referring to FIG. 6 to FIG. 8, in multi-antenna transmission, a BS uses a plurality of antennas, each of which has one resource grid. 'R0' denotes an RS for a first antenna, 'R1' denotes an RS for a second antenna, 'R2' denotes an RS for a third antenna, and 'R3' denotes an RS for a fourth antenna. R0 to R3 are located in a subframe without overlapping with one another. l indicates a position of an OFDM symbol in a slot. In case of a normal cyclic prefix (CP), l has a value in the range of 0 to 6. In one OFDM symbol, RSs for the respective antennas are located with a spacing of 6 subcarriers. In a subframe, the number of R0s is equal to the number of R1s, and the number of R2s is equal to the number of R3s. In the subframe, the number of R2s and R3s is less than the number of R0s and R1s. A resource element used for an RS of one antenna is not used for an RS of another antenna. This is to avoid interference between antennas.

The CRS is always transmitted by the number of antennas irrespective of the number of streams. The CRS has an independent RS for each antenna. A frequency-domain position and a time-domain position of the CRS in a subframe are determined irrespective of a UE. A CRS sequence to be multiplied to the CRS is generated also irrespective of the UE. Therefore, all UEs in a cell can receive the CRS. However, a position of the CRS in the subframe and the CRS sequence may be determined according to a cell identifier (ID). The time-domain position of the CRS in the subframe may be determined according to an antenna number and the number of OFDM symbols in a resource block. The frequency-domain position of the CRS in the subframe may be determined according to an antenna number, a cell ID, an OFDM symbol index l, a slot number in a radio frame, etc.

The CRS sequence may be applied on an OFDM symbol basis in one subframe. The CRS sequence may differ according to a cell ID, a slot number in one radio frame, an OFDM symbol index in a slot, a CP type, etc. The number of RS subcarriers for each antenna on one OFDM symbol is 2. When a subframe includes $N_{RB}$ resource blocks in a frequency domain, the number of RS subcarriers for each antenna on one OFDM symbol is $2 \times N_{RB}$. Therefore, a length of the CRS sequence is $2 \times N_{RB}$.

Equation 2 shows an example of a CRS sequence r(m).

$$r(m) = \frac{1}{\sqrt{2}}(1 - 2 \cdot c(2m)) + j\frac{1}{\sqrt{2}}(1 - 2 \cdot c(2m + 1)) \quad \text{[Equation 2]}$$

Herein, m is 0, 1, . . . , $2N_{RB,max}-1$. $N_{RB,max}$ denotes the number of resource blocks corresponding to a maximum bandwidth. For example, when using a 3GPP LTE system, $N_{RB,max}$ is 110. c(i) denotes a PN sequence as a pseudo-random sequence, and can be defined by a gold sequence having a length of 31. Equation 3 shows an example of a gold sequence c(n).

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{[Equation 3]}$$

Herein, $N_C$ is 1600, $x_1(i)$ denotes a $1^{st}$ m-sequence, and $x_2(i)$ denotes a $2^{nd}$ m-sequence. For example, the $1^{st}$ m-sequence or the $2^{nd}$ m-sequence can be initialized for each OFDM symbol according to a cell ID, a slot number in one radio frame, an OFDM symbol index in a slot, a CP type, etc.

In case of using a system having a bandwidth narrower than $N_{RB,max}$, a certain part with a length of $2 \times N_{RB}$ can be selected from an RS sequence generated in a length of $2 \times N_{RB,max}$.

The CRS may be used in the LTE-A system to estimate channel state information (CSI). If necessary for estimation of the CSI, channel quality indicator (CQI), a precoding matrix indicator (PMI), a rank indicator (RI), or the like may be reported from the UE.

A DRS is described below.

Figure 9:
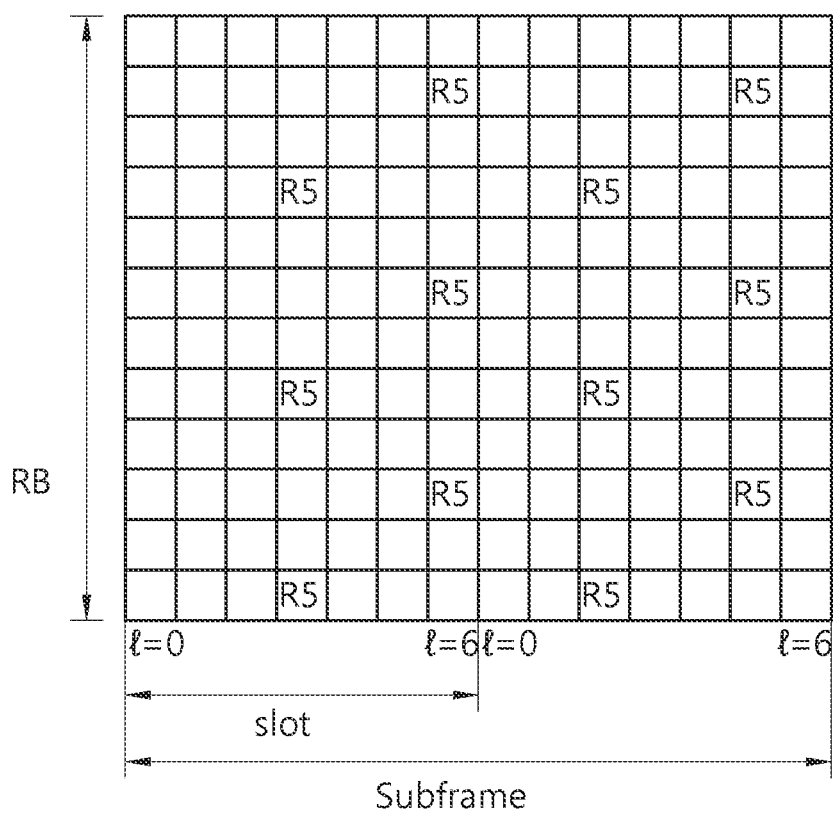
FIGS. 9 and 10 show examples of a DRS structure.
Figure 10:
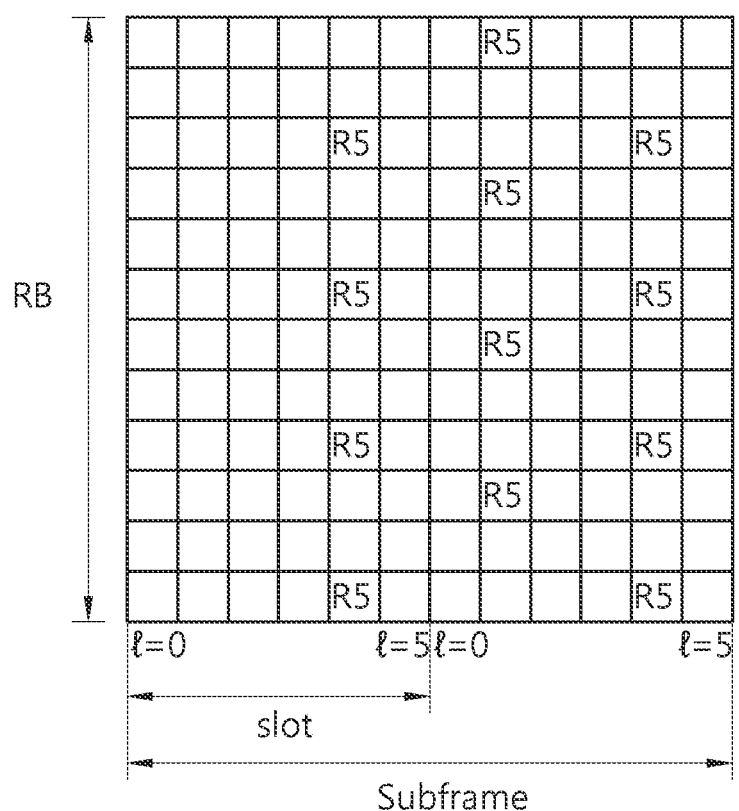

FIGS. 9 and 10 show examples of a DRS structure. FIG. 9 shows an example of the DRS structure in the normal CP. In the normal CP, a subframe includes 14 OFDM symbols. R5 indicates the reference signal of an antenna which transmits a DRS. On one OFDM symbol including a reference symbol, a reference signal subcarrier is positioned at intervals of four subcarriers. FIG. 10 shows an example of the DRS structure in the extended CP. In the extended CP, a subframe includes 12 OFDM symbols. On one OFDM symbol, a reference signal subcarrier is positioned at intervals of three subcarriers. For detailed information, reference can be made to Paragraph 6.10.3 of 3GPP TS 36.211 V8.2.0 (2008-03).

The position of a frequency domain and the position of a time domain within the subframe of a DRS can be determined by a resource block assigned for PDSCH transmission. A DRS sequence can be determined by a UE ID, and only a specific UE corresponding to the UE ID can receive a DRS.

A DRS sequence can be obtained using Equations 2 and 3. However, m in Equation 2 is determined by $N_{RB}^{PDSCH}$. $N_{RB}^{PDSCH}$ is the number of resource blocks corresponding to a bandwidth corresponding to PDSCH transmission. The length of a DRS sequence can be changed according to $N_{RB}^{PDSCH}$. That is, the length of a DRS sequence can be changed according to the amount of data assigned to a UE. In Equation 2, a first m-sequence $x_1(i)$ or a second m-sequence $x_2(i)$ can be reset according to a cell ID, the position of a subframe within one radio frame, a UE ID, etc. for every subframe.

A DRS sequence can be generated for every subframe and applied for every OFDM symbol. It is assumed that the number of reference signal subcarriers per resource block is 12 and the number of resource blocks is $N_{RB}^{PDSCH}$, within one subframe. The total number of reference signal subcarriers is $12 \times N_{RB}^{PDSCH}$ Accordingly, the length of the DRS sequence is $12 \times N_{RB}^{PDSCH}$. In the case in which DRS sequences are generated using Equation 2, m is 0, 1, . . . , $12 N_{RB}^{PDSCH} - 1$. The DRS sequences are sequentially mapped to reference symbols. The DRS sequence is first mapped to the reference symbol and then to a next OFDM symbol, in ascending powers of a subcarrier index in one OFDM symbol.

In the LTE-A system, a DRS can be use in PDSCH demodulation. Here, a PDSCH and a DRS can comply with the same precoding operation. The DRS can be transmitted only in a resource block or layer scheduled by a BS, and orthogonality is maintained between layers.

Further, a CRS can be used together with a DRS. For example, it is assumed that control information is transmitted through three OFDM symbols (l=0, 1, 2) of a first slot within a subframe. A CRS can be used in an OFDM symbol having an index of 0, 1, or 2 (l=0, 1, or 2), and a DRS can be used in the remaining OFDM symbol other than the three OFDM symbols. Here, by transmitting a predefined sequence which is multiplied by a downlink reference signal for each cell, interference between reference signals received by a receiver from neighbor cells can be reduced, and so the performance of channel estimation can be improved. The predefined sequence can be one of a PN sequence, an m-sequence, a Walsh Hadamard sequence, a ZC sequence, a GCL sequence, and a CAZAC sequence. The predefined sequence can be applied to each OFDM symbol within one subframe, and another sequence can be applied depending on a cell ID, a subframe number, the position of an OFDM symbol, and a UE ID.

In the LTE rel-8, DRS supports single layer beam-forming. On the other hand, the LTE rel-9 and the LTE-A support dual layer beam-forming. Also, the LTE-A supports up to eight transmit antennas, attempting improving performance throughput. In what follows, a DRS of the LTE rel-9 and the LTE-A is called a DMRS. The DMRS can be precoded and employ as many orthogonal patterns as the number of ranks or layers distinguished from each other. Obviously, DMRS may not be precoded. The DMRS for multiple layers is mapped to a subframe or a resource block according to a predetermined reference signal pattern and the reference signal pattern can be formed in units of one subframe and one resource block.

In what follows, a method for transmitting a reference signal according to the present invention will be described through an embodiment.

Figure 11:
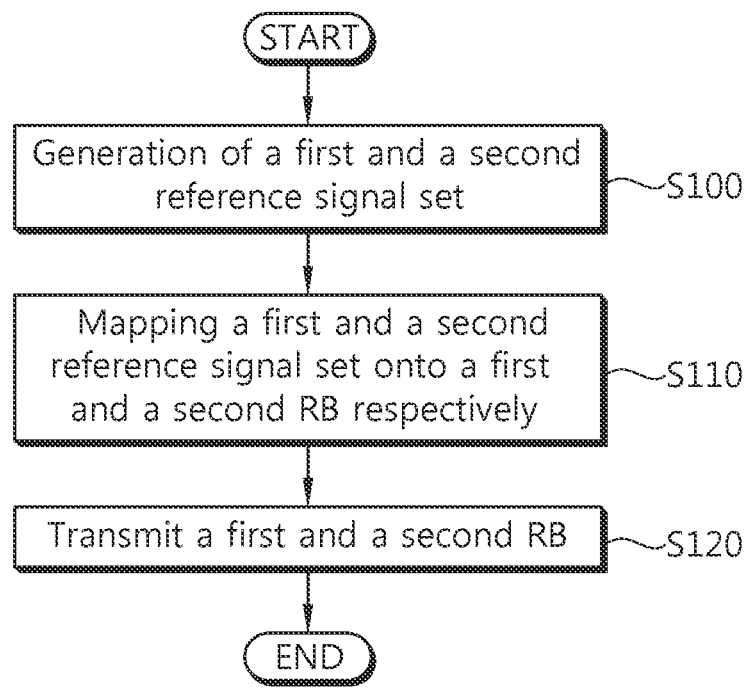
FIG. 11 is one embodiment of a method for transmitting reference signals according to the present invention.

FIG. 11 is one embodiment of a method for transmitting reference signals according to the present invention.

At S100 step, a base station generates a first reference signal set and a second reference signal set. At S100 step, the base station maps the first reference signal set and the second reference signal set onto a first RB according to a first reference signal pattern; and maps the first reference signal set and the second reference signal set onto a second RB according to a second reference signal pattern. At S120 step, the base station transmits the first RB and the second RB to a UE. The first reference signal pattern and the second reference signal pattern are a reference signal pattern formed in units of one subframe and one RB. Also, the resource element onto which the first reference signal set and the second reference signal set are mapped respectively according to the second reference signal pattern corresponds to the resource element onto which the second reference signal set and the first reference signal set are mapped respectively according to the first reference signal pattern.

According to a method for transmitting a reference signal of the present invention, when a reference signal for multiple layers is mapped on to two or more RBs, positions of resource elements mapped can be swapped with each other within the two or more RBs. The swapping represents the case where a method for assigning a reference signal in units of RBs is extended to a case of multiple RBs. Accordingly, if two or more RBs are assigned contiguously to the user while maintaining performance of channel estimation within each RB at the same level, performance of channel estimation within the two or more RBs can be improved.

First, a case where a method for transmitting a reference signal according to the present invention is applied to DMRS is described. In a reference signal pattern that follows, the horizontal axis represents time domain while the vertical axis represents frequency domain. Also, reference signal pattern below is assigned to one subframe including two slots in the horizontal axis and two RBs in the vertical axis. R0 to R3 corresponds to CRS of the LTE Rel-8 system for four transmit antennas. A first RB may correspond to an RB indexed with N while the second RB may correspond to an RB indexed with (N+1).

Figure 12:
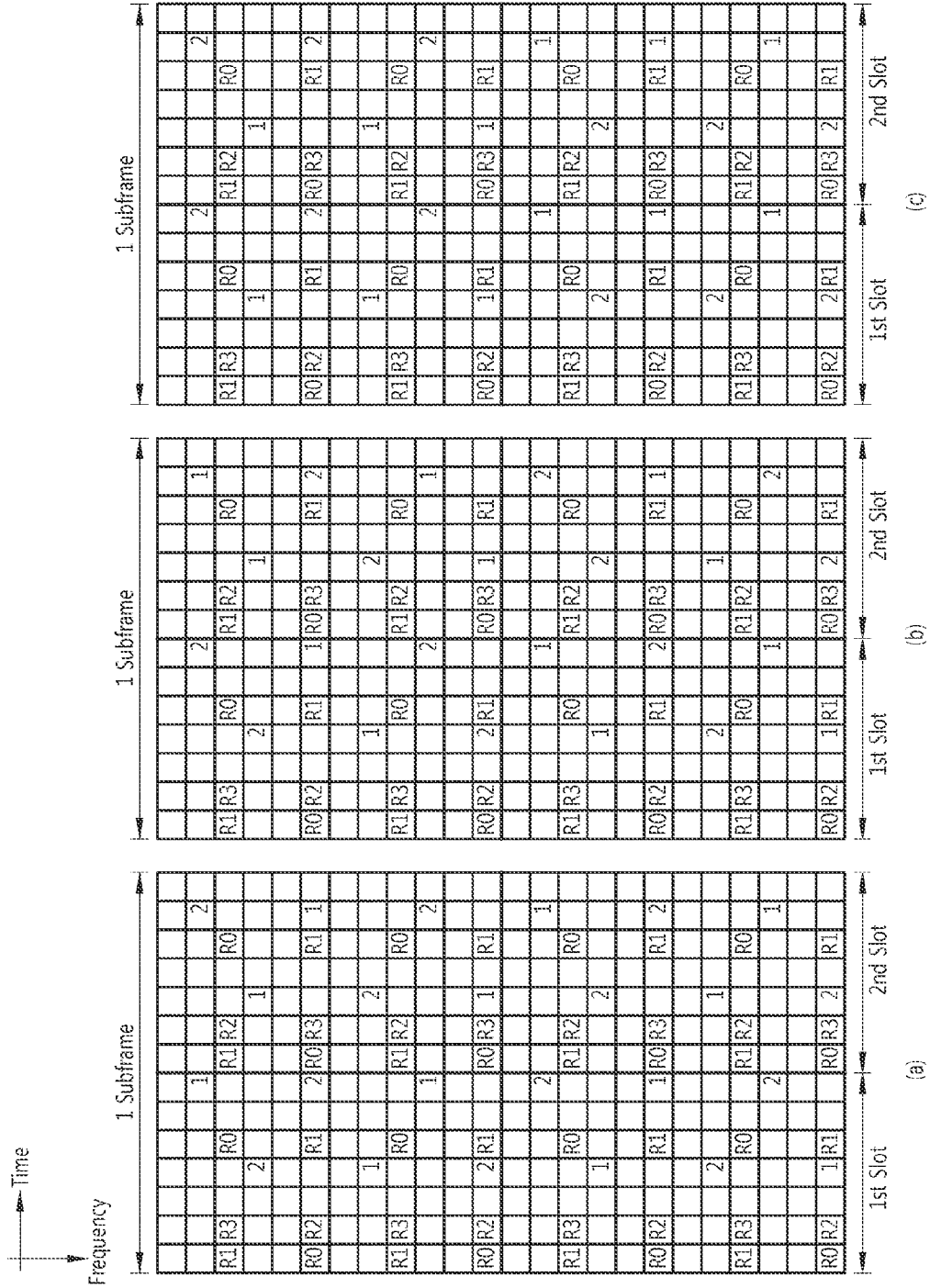
FIGS. 12 to 19 are one example of a reference signal pattern according to a method for transmitting a reference signal according to the present invention.

FIG. 12 is one example of a reference signal pattern according to a method for transmitting a reference signal according to the present invention. FIG. 12 illustrates a case where a first reference signal for a first layer and a second reference signal for a second layer are transmitted by being multiplexed in frequency division multiplexing (FDM) manner in normal CP. The first reference signal and the second reference signal of FIG. 12-(a) are mapped to the 4-th, the 7-th, the 10-th, and the $13^{th}$ OFDM symbol (OFDM symbol index 3, 6, 9, and 12). At the first RB, the first reference signal and the second reference signal are mapped according to the first reference signal pattern. At the first RB, the first reference signal is mapped to the 8-th subcarrier of the 4-th OFDM symbol; the 2nd and the 10-th subcarrier of the 7-thOFDM symbol; the 4-th and the 12-th subcarrier of the 10-th OFDM symbol; and the 6-th subcarrier of the 13-th OFDM symbol. At the first RB, the second reference signal is mapped to the 4-th and the 12-th subcarrier of the 4-th OFDM symbol; the 6-th subcarrier of the 7-th OFDM symbol; the 8-th subcarrier of the 10-th OFDM symbol; and the 2nd and the 10-th subcarrier of the 13-th OFDM symbol. Next, the first reference signal and the second reference signal are mapped onto a consecutive second RB. At this time, in the reference signal pattern mapped to the first RB, position at which the first reference signal is mapped and the position at which the second reference signal is mapped are swapped. Accordingly, a second reference signal pattern is formed. Namely, at the second RB, the first reference signal is mapped to the 4-th and the 12-th subcarrier of the 4-th OFDM symbol; the 6-th subcarrier of the 7-th OFDM symbol; the 8-th subcarrier of the 10-th OFDM symbol; and the 2nd and the 10-th subcarrier of the 13-th OFDM symbol. At the second RB, the second reference signal is mapped to the 8-th subcarrier of the 4-th OFDM symbol; the 2nd and the 10-th subcarrier of the 7-th OFDM symbol; the 4-th and the 12-th subcarrier of the 10-th OFDM symbol; and the 6-th subcarrier of the 13-th OFDM symbol. A reference signal for different layers is multiplexed in FDM manner and since spacing between reference signals for individual layers are kept constant within two RBs when the two RBs are assigned to the UE, performance of channel estimation can be improved.

As shown in FIGS. 12-(b) and (c), when a reference signal for each layer is mapped onto a second RB, the position at which the first reference signal is mapped and the position at which the second reference signal is mapped are swapped to each other in a reference signal pattern mapped to the first RB. As shown in FIG. 12-(c), although the first reference signal and the second reference signal are not mapped with the same spacing within the two RBs, transmission power can be kept at the same level as the same number of reference signals are transmitted respectively within a single OFDM symbol.

Though FIG. 12 illustrates that the first reference signal and the second reference signal are multiplexed in FDM manner, the reference signals can be multiplexed in code division multiplexing (CDM) or time division multiplexing (TDM) manner and furthermore, the reference signals can be multiplexed through multiplexing based on a hybrid of CDM/TDM or CDM/FDM. Also, the first reference signal pattern can take various forms in addition to an example of FIG. 12; at this time, too, a method for transmitting a reference signal according to the present invention can be applied. Meanwhile, although the present embodiment illustrates a case where the number of layers is two for the convenience of description, the method of transmitting a reference signal according to the present invention can also be applied for the case where the number of layers is two or more.

Meanwhile, if different reference signal set is used for each layer, a base station can assign different reference signal sets for individual layers separately according to RB index within multiple RBs assigned to each UE. At this time, RB index denotes physical RB index in the frequency domain and logical RB index can also be applied if the logical RB index is assigned consecutively to the physical RB index. For example, now it is assumed that the number of layers is two and the number of RBs assigned to a first user is two and the number of RBs assigned to a second user is three. If the RB index assigned to the first user is N and N+1, a first reference signal according to a first reference signal pattern can be assigned to an RB indexed with N and a first reference signal according to a second reference signal pattern can be assigned to an RB indexed with N+1. Furthermore, if the RB index assigned to the second user is M, M+1, and M+2, a first reference signal according to a second reference signal pattern can be assigned to an RB indexed with M and a first reference signal according to a first reference signal pattern can be assigned to an RB indexed with M+1 and a first reference signal according to a second reference signal pattern can be assigned to an RB indexed with M+2. In other words, if RB index is odd (or even) within multiple RBs assigned to each user, a reference signal is assigned according to a first reference signal pattern while if the RB index is even (or odd), a reference signal according to a second reference signal pattern can be assigned. At this time, the RB index denotes RB index within multiple RBs assigned to each user rather than cell-common RB index assigned.

Figure 13:
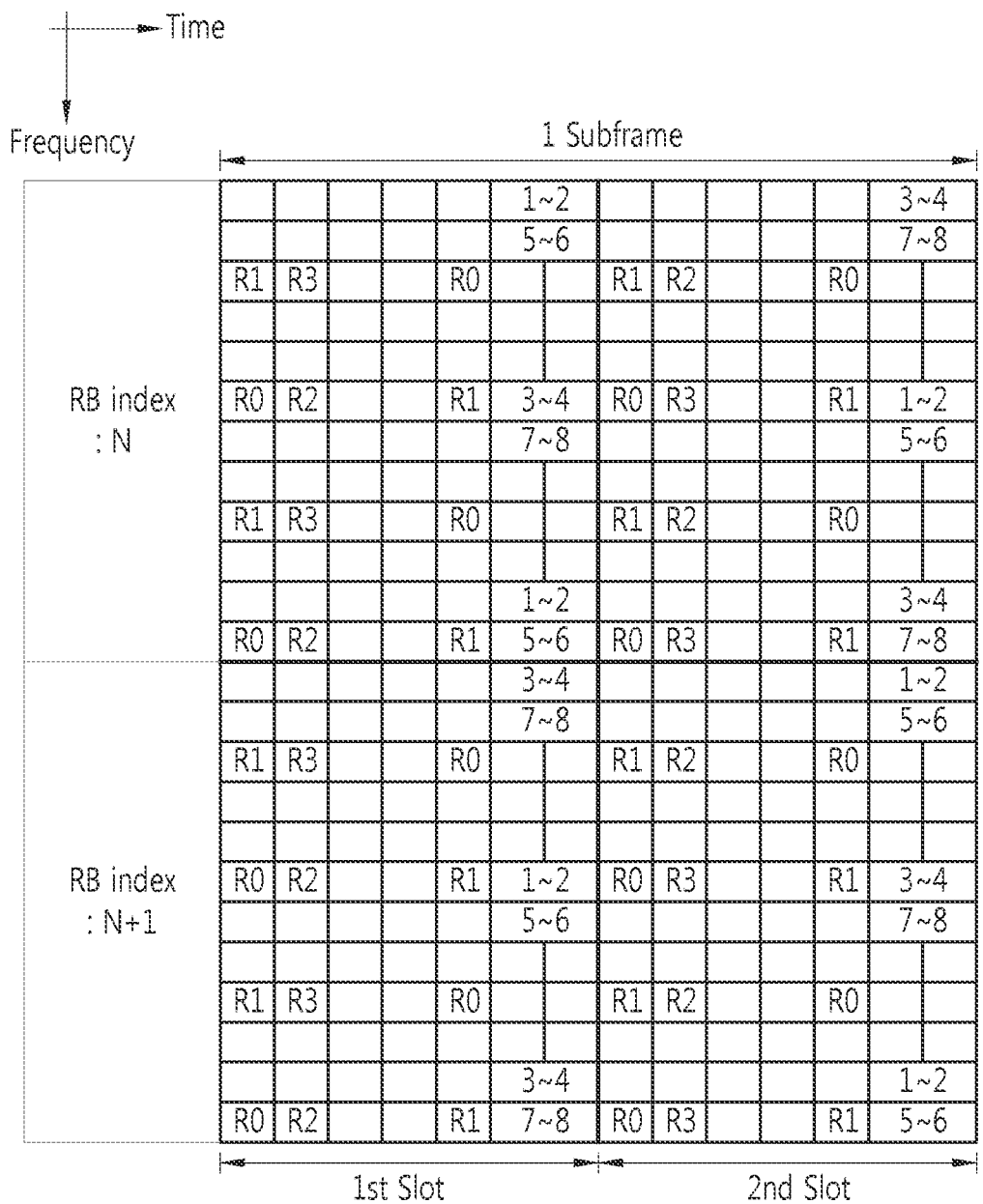

FIG. 13 is still another example of a reference signal pattern according to a method for transmitting a reference signal according to the present invention. FIG. 13 illustrates a case where a first reference signal to an eighth reference signal for a first layer to an eighth layer is transmitted respectively by being multiplexed in CDM/FDM manner in normal CP.

In FIG. 13, a first reference signal and a second reference signal (a first reference signal set); a third reference signal and a fourth reference signal (a second reference signal set); a fifth reference signal and a sixth reference signal (a third reference signal set); and a seventh reference signal and an eighth reference signal (a fourth reference signal set) are multiplexed respectively in CDM manner. The above configuration is only an example and multiplexing can be carried out in CDM manner by grouping the reference signals in another combination. At this time, an orthogonal code of length 2 can be used. Also, a first reference signal set to a fourth reference signal set are multiplexed in FDM manner. The first reference signal set to the fourth reference signal set are mapped to the 6-th to the 7-th OFDM symbol and the 13-th to the 14-th OFDM symbol of a subframe (OFDM symbol index 5-6, 12-13). The first to the fourth reference signal set are mapped to a first RB indexed with N according to a first reference signal pattern. When the first reference signal set to the fourth reference signal set are mapped to a second RB, positions at which the first reference signal set and the second reference signal set are mapped are swapped to each other in the first reference signal pattern; and the position at which the third reference signal set and the fourth reference signal set are mapped are swapped to each other. For example, the first reference signal set is multiplexed and mapped in CDM manner to a first subcarrier of the 6-th to the 7-th OFDM symbol of a first RB; and the second reference signal set is multiplexed and mapped in CDM manner to a first subcarrier of the 13-th to the 14-th OFDM symbol. For a second RB, the above configuration is swapped such that the second reference signal set is multiplexed and mapped to a first subcarrier of the 6-th to the 7-th OFDM symbol of a second RB; and the first reference signal set is multiplexed and mapped to a first subcarrier of the 13-th to the 14-th OFDM symbol. Accordingly, since spacing between reference signals about individual layers are kept constant within two RBs when the two RBs are assigned to the UE, performance of channel estimation can be improved.

Figure 14:
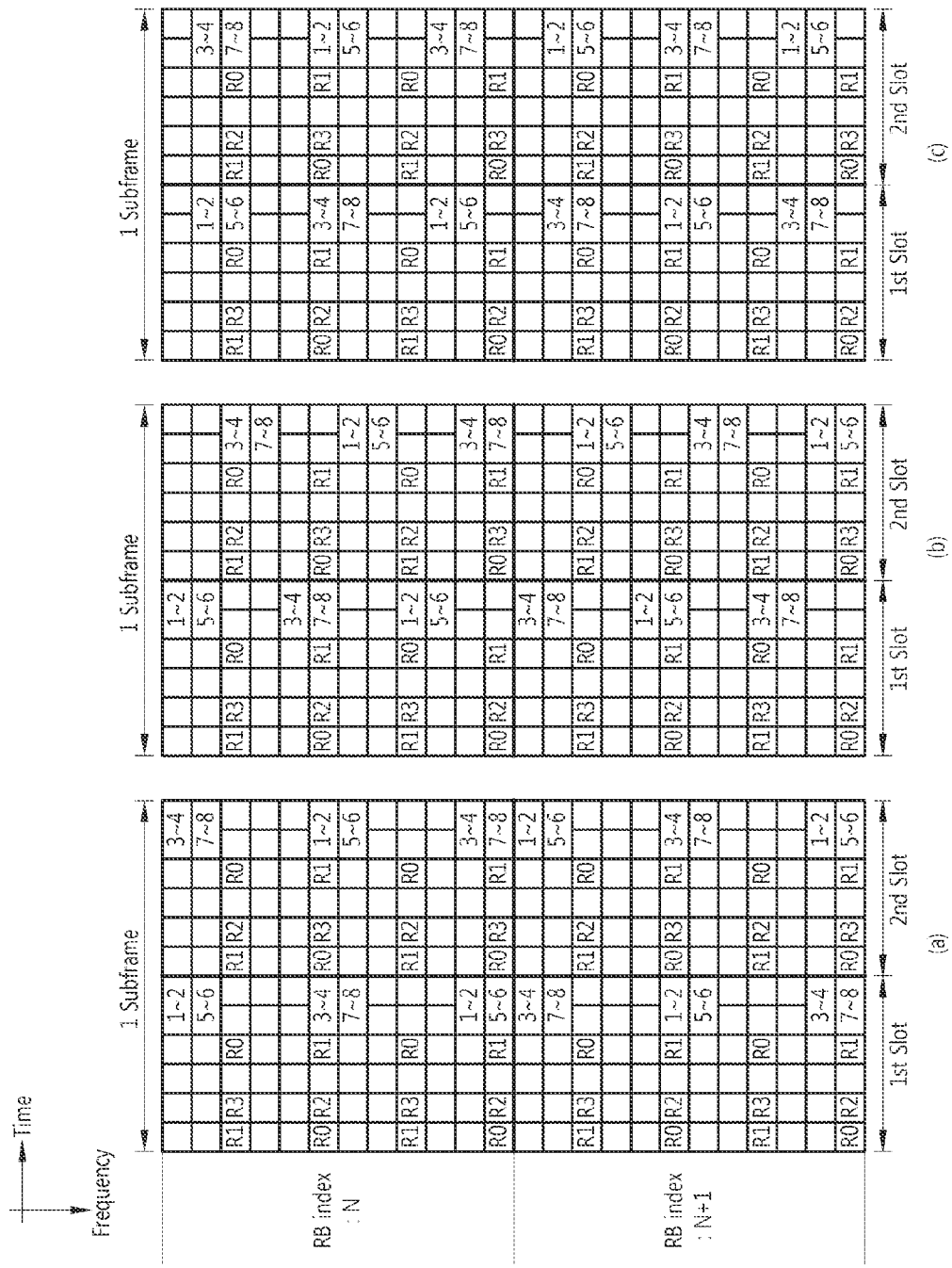
Figure 15:
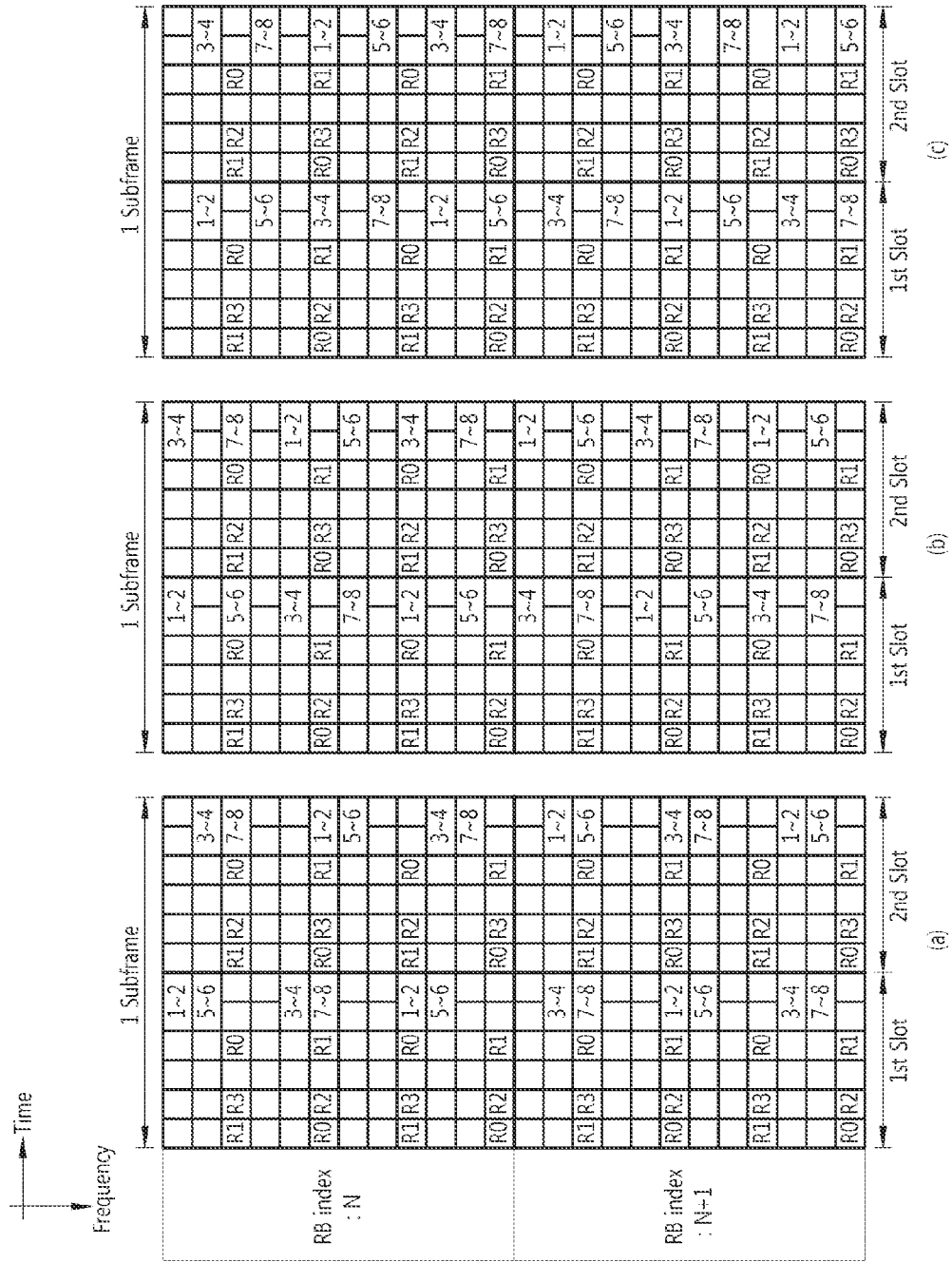

FIGS. 14 and 15 are yet another example of a reference signal pattern according to a method for transmitting a reference signal according to the present invention. FIGS. 14 and 15 illustrate a case where a first to an eighth reference signal for a first to an eighth layer is transmitted respectively by being multiplexed in CDM/FDM manner in extended CP.

As shown in FIGS. 14 and 15, a first reference signal and a second reference signal (a first reference signal set); a third reference signal and a fourth reference signal (a second reference signal set); a fifth reference signal and a sixth reference signal (a third reference signal set); and a seventh reference signal and an eighth reference signal (a fourth reference signal set) are multiplexed respectively in CDM manner. The above configuration is only an example and multiplexing can be carried out in CDM manner by grouping the reference signals in another combination. At this time, an orthogonal code of length 2 can be used. Also, a first reference signal set to the fourth reference signal set are multiplexed in FDM manner. The first reference signal set to the fourth reference signal set can be mapped in various forms while keeping equal spacing respectively within OFDM symbols.

In the above embodiment, descriptions have been given to the case where a method for transmitting reference signals according to the present invention is applied when two RBs have been assigned to a UE but are not limited to the above. The present invention can be applied when the number of RBs assigned to the UE is the multiple of 2. When the number of RBs assigned to the UE is the multiple of 2, a reference signal for each layer is transmitted with the same density from the entire RB; thus, imbalance of transmission power can be removed. The present invention can also be applied even if the number of RBs assigned to the UE is not the multiple of 2. However, to make the transmission power between individual layers at the same level, transmission power of a resource element to which a reference signal for each layer is mapped can be adjusted. The parameter adjusting transmission power as described above can be transmitted from a higher layer or through a control channel.

In the embodiment above, descriptions have been given to the case where a reference signal is assigned according to RB index assigned to each UE when multiple RBs are assigned to each individual UE; however, different reference signal sets can be assigned differently from each other according to RB index assigned in a cell-specific manner. At this time, RB index denotes physical RB index in the frequency domain and logical RB index can also be applied if the logical RB index is assigned consecutively to the physical RB index. For example, now it is assumed that the number of layers is two and the number of RBs assigned to a first user is two and the number of RBs assigned to a second user is three. If the RB index assigned to the first user is N and N+1, a first reference signal according to a first reference signal pattern can be assigned to an RB indexed with N and a first reference signal according to a second reference signal pattern can be assigned to an RB indexed with N+1. Furthermore, if the RB index assigned to the second user is M, M+1, and M+2, a first reference signal according to a second reference signal pattern can be assigned to an RB indexed with M and a first reference signal according to a first reference signal pattern can be assigned to an RB indexed with M+1 and a first reference signal according to a second reference signal pattern can be assigned to an RB indexed with M+2. In other words, if RB index is odd (or even) within a cell, a reference signal is assigned according to a first reference signal pattern while if the RB index is even (or odd), a reference signal according to a second reference signal pattern can be assigned. At this time, the RB index denotes cell-common RB index assigned rather than RB index within multiple RBs assigned to each user. To obtain interference mitigation effect between disparate cells, different reference signal sets for individual layers are assigned differently from each other according to RB index within the same RB between the disparate cells.

Or, different reference signal sets can be assigned according to consecutively assigned RB indexes for multiple cells irrespective of cell configuration or UE configuration, which is a method for assigning a reference signal according to network-common RB index.

A method of transmitting a reference signal according to the present invention can be applied to CSI-RS (or CQI-RS) of the LTE-A in addition to DMRS. In the embodiment below, C0 to C7 denotes CSI-RS for a first to an eighth layer. However, the present invention is not limited to the embodiment and assignment can be performed in various ways. C0 to C7 can be mapped to resource elements under the conditions that CRS (R0 to R3) and DMRS (1~2, 3~4) have been assigned. In a reference signal pattern that follows, the horizontal axis represents time domain while the vertical axis represents frequency domain. Also, reference signal pattern below is assigned to one subframe including two slots in the horizontal axis and two RBs in the vertical axis. R0 to R3 corresponds to CRS of the LTE Rel-8 system for four transmit antennas. 1~2 and 3~4 denote a demodulation reference signal for individual layers. By applying the present invention to CSI-RS, it can be made that difference of transmission power between layers to which individual CSI-RS is assigned may not be generated.

Figure 16:
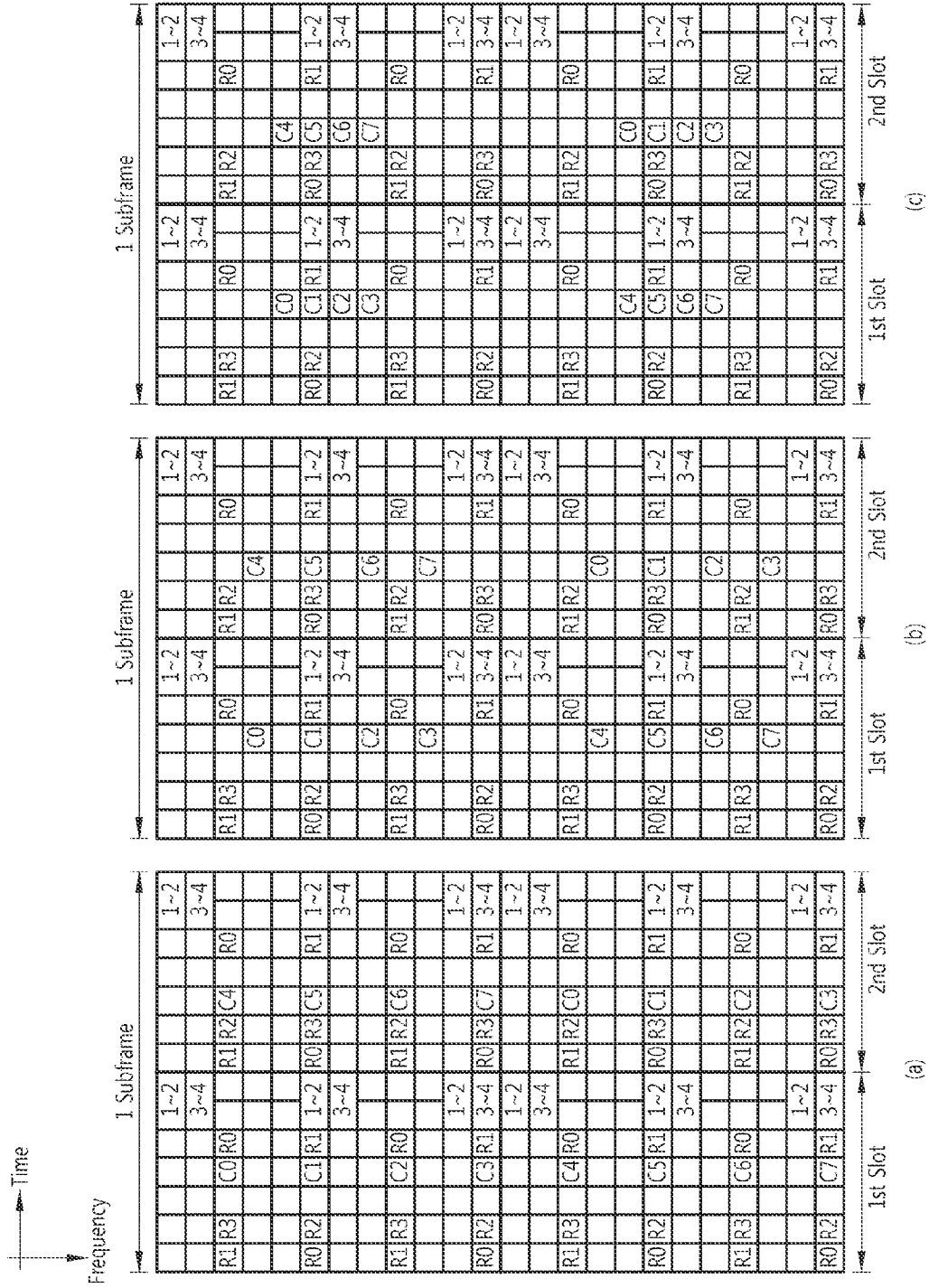
Figure 17:
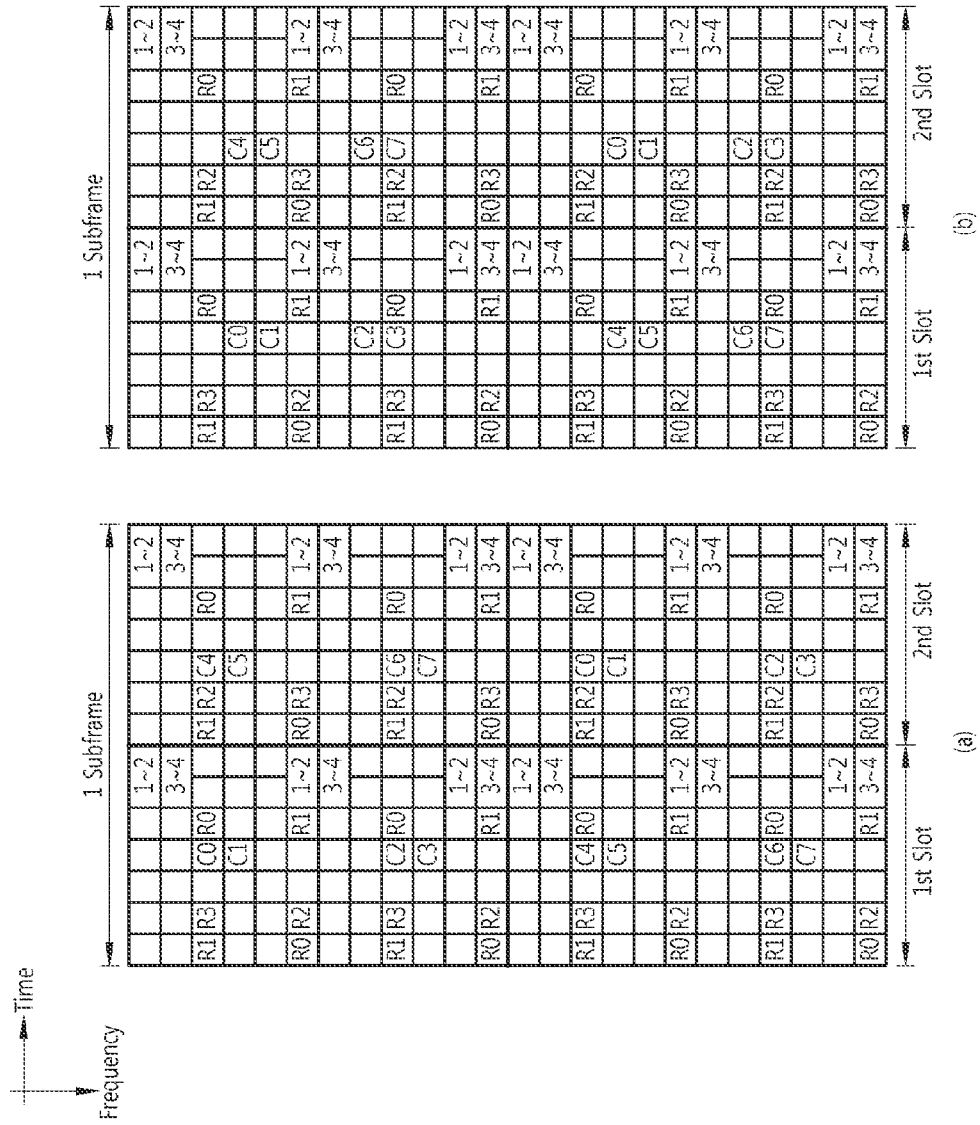

FIGS. 16 and 17 are a further example of a reference signal pattern according to a method for transmitting a reference signal according to the present invention. FIGS. 16 and 17 illustrate a case where a first to an eighth CSI-RS for a first to an eighth layer are transmitted in normal CP.

FIG. 16-(a) shows a case where CSI-RS for each layer is assigned with an interval of three subcarriers. In a first RB, C0 to C3 are assigned with an interval of three subcarriers to a fourth OFDM symbol; and C4 to C7 are assigned with an interval of three subcarriers to a tenth OFDM symbol. In a second RB, C4 to C7 are assigned with an interval of three subcarriers to a fourth OFDM symbol; and C0 to C3 are assigned with an interval of three subcarriers to a tenth OFDM symbol. Also, it is assumed that at each RB, the subcarrier to which CSI-RS is first mapped is a third subcarrier, namely, a case where a frequency offset is two; however, the frequency offset can be any one of 0 to 2.

FIG. 16-(b) shows a case where CSI-RS for each layer is assigned with an interval of two subcarriers. In a first RB, C0 to C3 are assigned with an interval of two subcarriers to a fourth OFDM symbol; and C4 to C7 are assigned with an interval of two subcarriers to a tenth OFDM symbol. In a second RB, C4 to C7 are assigned with an interval of two subcarriers to a fourth OFDM symbol; and C0 to C3 are assigned with an interval of two subcarriers to a tenth OFDM symbol. Also, it is assumed that at each RB, the subcarrier to which CSI-RS is first mapped is a fourth subcarrier, namely, a case where a frequency offset is three; however, the frequency offset can be any one of 0 to 5.

FIG. 16-(c) shows a case where CSI-RS for each layer is assigned with an interval of one subcarrier. In a first RB, C0 to C3 are assigned with an interval of one subcarrier to a fourth OFDM symbol; and C4 to C7 are assigned with an interval of one subcarrier to a tenth OFDM symbol. In a second RB, C4 to C7 are assigned with an interval of one subcarrier to a fourth OFDM symbol; and C0 to C3 are assigned with an interval of one subcarrier to a tenth OFDM symbol. Also, it is assumed that at each RB, the subcarrier to which CSI-RS is first mapped is a fifth subcarrier, namely, a case where a frequency offset is four; however, the frequency offset can be any one of 0 to 8.

In the same manner as FIG. 16, the positions to which CSI-RSs are mapped are swapped to each other in two RBs of FIG. 17. In FIG. 17-(a), it is assumed that at each RB, the subcarrier to which CSI-RS is first mapped is a third subcarrier, namely, a case where a frequency offset is two; however, the frequency offset can be any one of 0 to 4. Also, in FIG. 17-(b), it is assumed that at each RB, the subcarrier to which CSI-RS is first mapped is a fourth subcarrier, namely, a case where a frequency offset is three; however, the frequency offset can be any one of 0 to 6.

In the embodiments of FIGS. 16 and 17, it is assumed that CSI-RS is mapped to a fourth and a tenth OFDM symbol; however, the present invention is not limited to the embodiments and CSI-RS can be mapped to any two OFDM symbols from among a fourth, a tenth, and a eleventh OFDM symbols.

Figure 18:
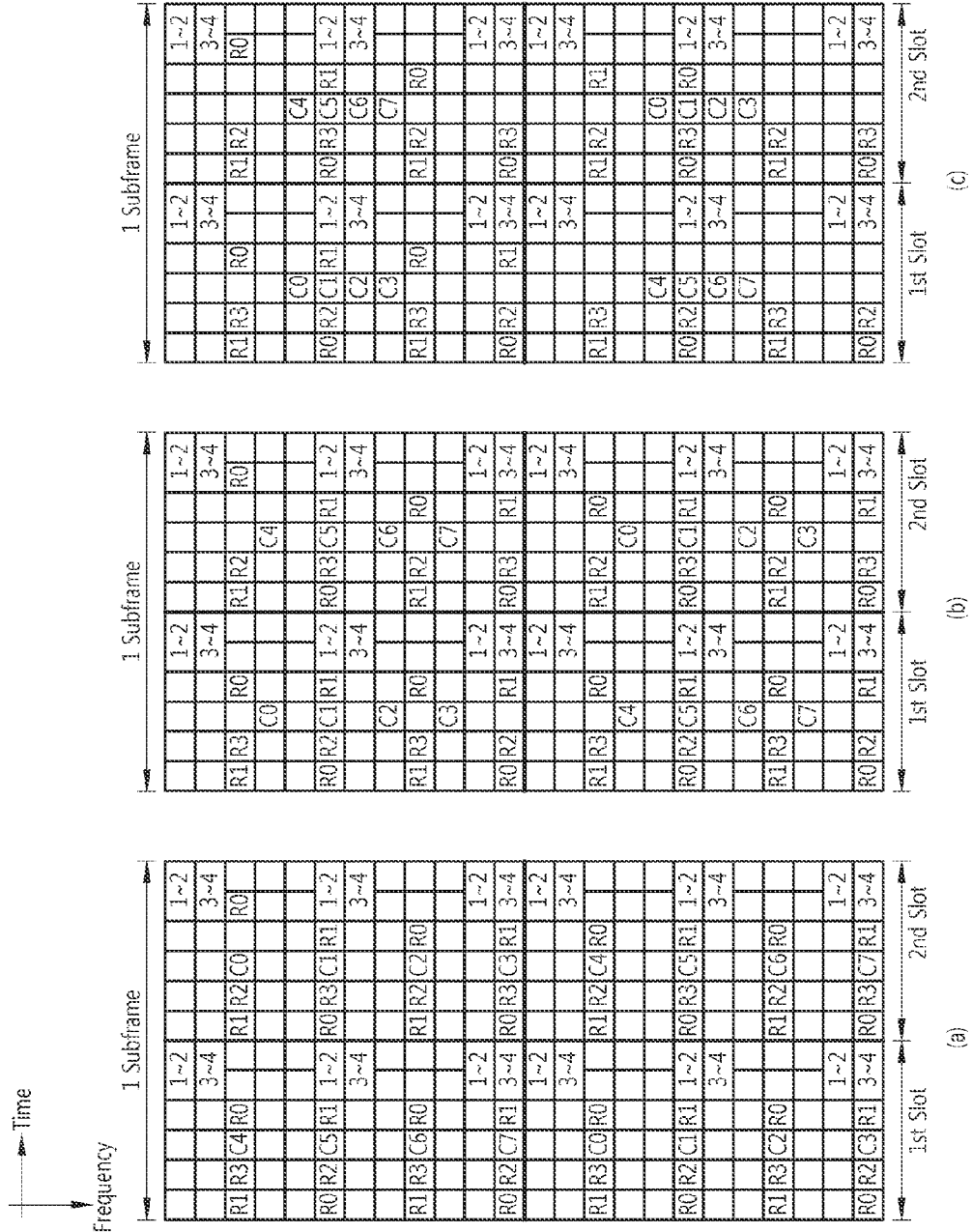

FIG. 18 is a still further example of a reference signal pattern according to a method for transmitting reference signals according to the present invention. FIG. 18 illustrates a case where a first to an eighth CSI-RS for a first to an eighth layer are transmitted in extended CP.

In the same manner as FIGS. 16 and 17, the positions to which CSI-RSs are mapped are swapped to each other in two RBs of FIG. 18. FIG. 18-(a) shows a case where CSI-RS for each layer is assigned with an interval of three subcarriers. It is assumed that at each RB, the subcarrier to which CSI-RS is first mapped is a third subcarrier, namely, a case where a frequency offset is two; however, the frequency offset can be any one of 0 to 2. FIG. 18-(b) shows a case where CSI-RS for each layer is assigned with an interval of two subcarriers. It is assumed that at each RB, the subcarrier to which CSI-RS is first mapped is a third subcarrier, namely, a case where a frequency offset is two; however, the frequency offset can be any one of 0 to 5. FIG. 18-(c) shows a case where CSI-RS for each layer is assigned with an interval of one subcarrier. It is assumed that at each RB, the subcarrier to which CSI-RS is first mapped is a fifth subcarrier, namely, a case where a frequency offset is four; however, the frequency offset can be any one of 0 to 8.

The embodiment above illustrates a case where for power boosting, CSI-RS for each layer is transmitted at OFDM symbol to which CRS or DMRS of the LTE Rel-8 system for each layer is not assigned. However, CSI-RS for each layer can be transmitted at OFDM symbol to which CRS or DMRS of the LTE Rel-8 system for each layer is assigned.

Figure 19:
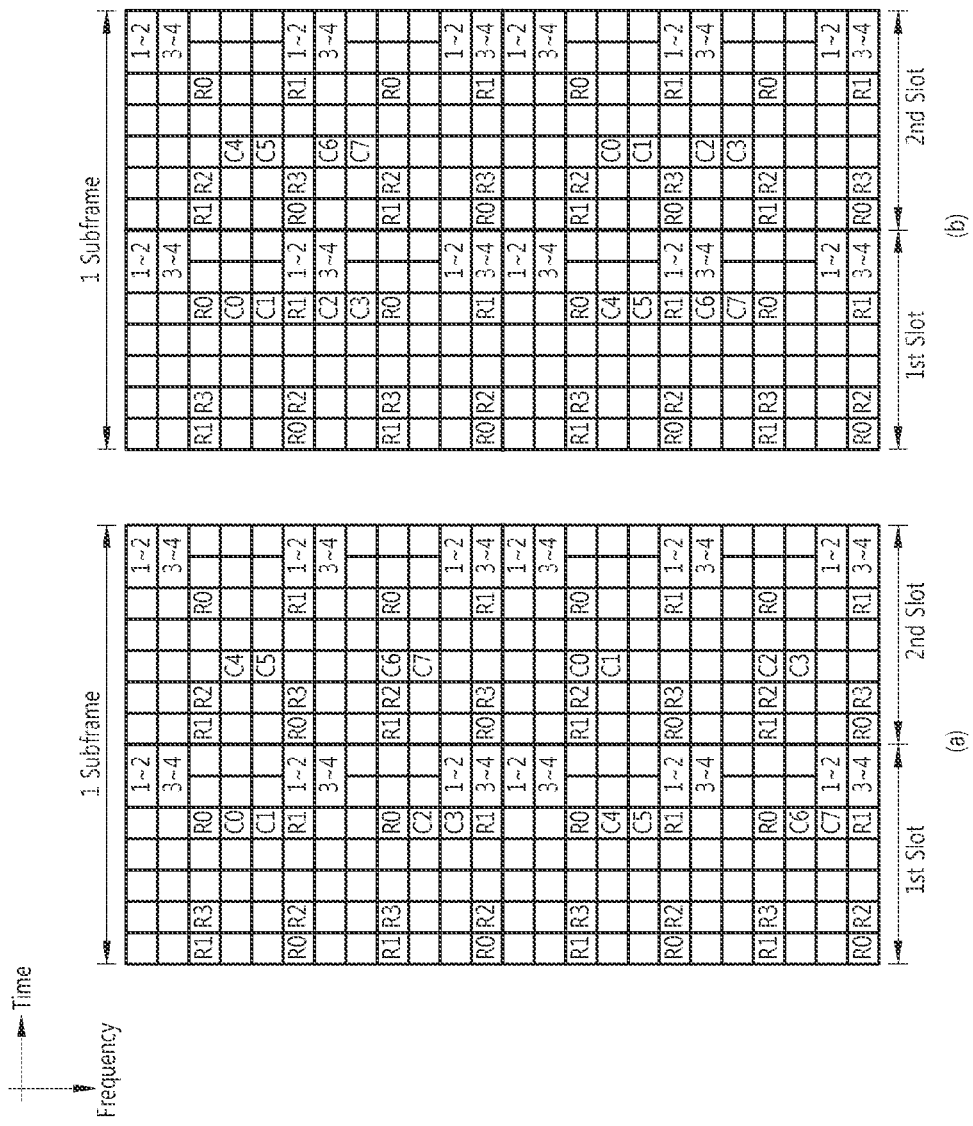

FIG. 19 is still another example of a reference signal pattern according to a method for transmitting reference signals according to the present invention. FIG. 19 illustrates a case where a first to an eighth CSI-RS for a first to an eighth layer are transmitted in extended CP.

FIG. 19 illustrates that C0 to C7 are mapped to a fourth and a ninth OFDM symbol of a first and a second RB. C0 to C7 are mapped together with CRS of the LTE Rel-8 system at the fourth OFDM symbol. However, the present invention is not limited to the above case; the C0 to C7 can be mapped to any two OFDM symbols from among the 4-th, the 7-th, the 8-th, the 9-th, and the 10-th OFDM symbols. In FIG. 19-(a), it is assumed that at each RB, the subcarrier to which CSI-RS is first mapped is a fourth subcarrier, namely, a case where a frequency offset is three; however, the frequency offset can be any one of 0 and 3. In FIG. 19-(b), it is assumed that at each RB, the subcarrier to which CSI-RS is first mapped is a fourth subcarrier, namely, a case where a frequency offset is three; however, the frequency offset can be any one of 0, 3, and 6.

In the embodiment above, a frequency offset can be determined based on a cell ID. For example, the frequency offset value can be determined as (cell ID mod N). Since reference signals at neighbor cells are transmitted by using different frequency, interference from adjacent cells can be prevented.

Figure 20:
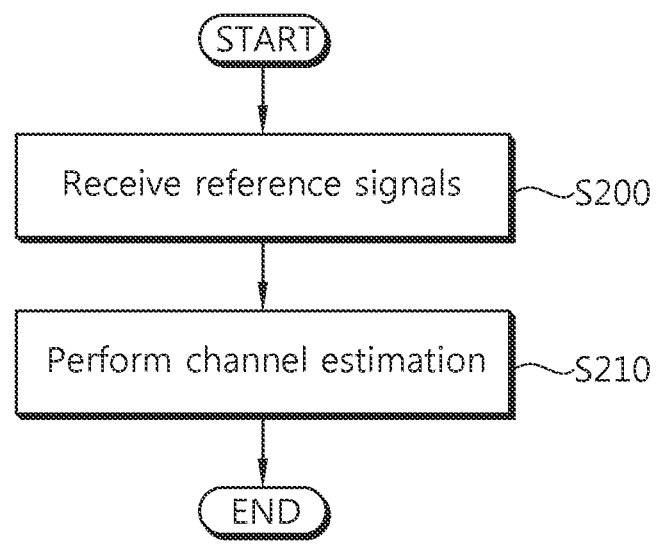
FIG. 20 is one embodiment of a method for channel estimation according to the present invention.

FIG. 20 is one embodiment of a method for channel estimation according to the present invention.

At S200 step, a UE receives a reference signal from a base station. At S210 step, the UE processes the reference signal and performs channel estimation. The reference signal is transmitted through a first RB and a second RB consecutive to the first RB; the reference signal is mapped within the first RB according to a first reference signal pattern and mapped within the second RB according to a second reference signal pattern. According to the first and the second reference signal pattern, the positions of resource elements at which the reference signals are mapped can be swapped to each other within the first and the second RB.

Figure 21:
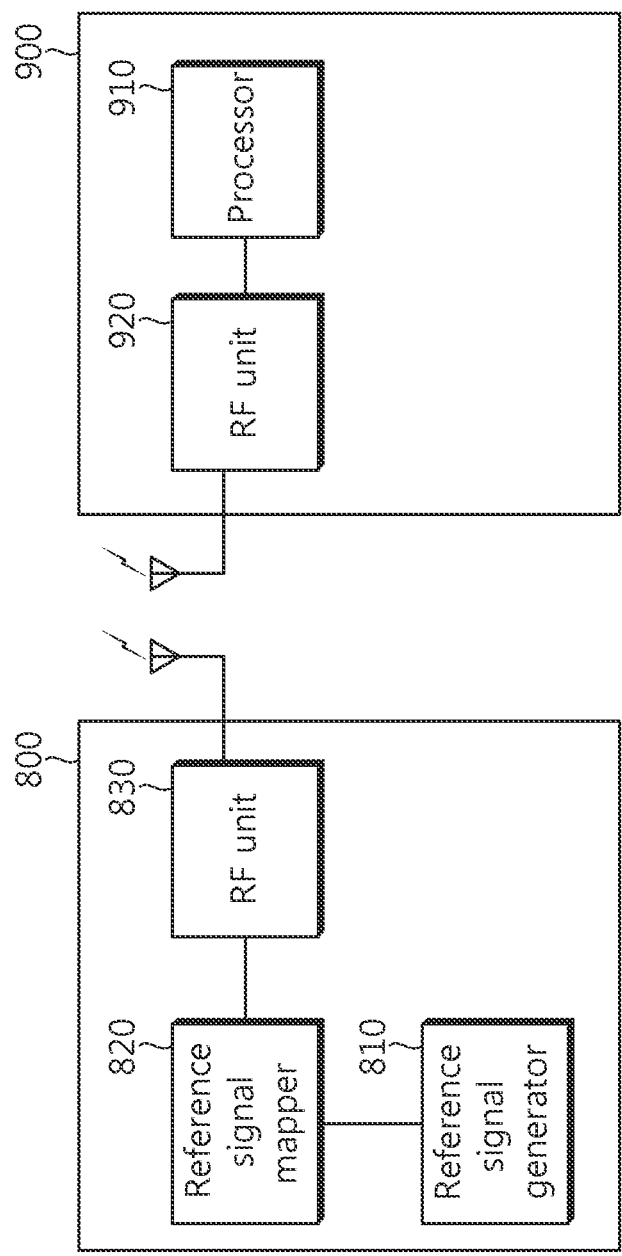
FIG. 21 is a block diagram illustrating a base station and a UE in which an embodiment of the present invention is implemented.

FIG. 21 is a block diagram illustrating a base station and a UE in which an embodiment of the present invention is implemented.

A base station 800 implements a method and/or a function of the present invention. The base station 800 comprises a reference signal generator 810, a reference signal mapper 820, and a radio frequency (RF) unit 830. The reference signal generator 810 generates a first and a second reference signal set. The reference signal mapper 820 maps the first and the second reference signal set to a first RB according to a first reference signal pattern and maps the first and the second reference signal set to a second RB consecutive to the first RB according to a second reference signal pattern. The RF unit transmits the first and the second RB to the UE. The first and the second reference signal pattern are a reference signal pattern formed in units of one subframe and one RB. Also, the resource element onto which the first and the second reference signal set are mapped respectively according to the second reference signal pattern corresponds to the resource element onto which the second and the first reference signal set are mapped respectively according to the first reference signal pattern. The method for transmitting reference signals of the present invention shown in FIG. 11 can be implemented by the base station 800; accordingly, reference signals for multiple layers can be transmitted according to reference signal patterns of FIG. 12 to FIG. 19.

A receiver 900 comprises a processor 910 and an RF unit 920. The RF unit 920 receives reference signals. The processor 910 processes the reference signals and performs data demodulation or channel estimation. The reference signals are transmitted through a first RB and a second RB consecutive to the first RB; the reference signals are mapped within the first RB according to a first reference signal pattern and are mapped within the second RB according to a second reference signal pattern. According to the first and the second reference signal pattern, the positions of resource elements at which the reference signals are mapped are swapped to each other within the first and the second RB. In other words, the reference signals transmitted according to the reference signal patterns of FIGS. 12 to 19 are received.

The present invention may be implemented by hardware, software, or a combination thereof. The hardware may be implemented as an application specific integrated circuit (ASIC), digital signal processing (DSP), a programmable logic device (PLD), a field programmable gate array (FPGA), a processor, a controller, a microprocessor, other electronic units, or a combination thereof, all of which is designed in order to perform the above-mentioned functions. The software may be implemented as a module performing the above-mentioned functions. The software may be stored in a memory unit and is executed by a processor. The memory unit or the processor may adopt various units that are known to those skilled in the art.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

What is claimed is:

1. A method for transmitting a reference signal in a wireless communication system, the method comprising:
    configuring a first pattern in both a first symbol and second symbol in a first resource block (RB);
    configuring a second pattern in both the first symbol and second symbol in a second RB, the second RB adjacent the first RB in a frequency domain;
    transmitting a first reference signal for a first layer, the first reference signal transmitted in the first symbol in the first RB according to the first pattern;
    transmitting a second reference signal for a second layer, the second reference signal transmitted in the second symbol in the first RB according to the first pattern;
    transmitting the first reference signal in the second symbol in the second RB according to the second pattern; and
    transmitting the second reference signal in the first symbol in the second RB according to the second pattern,
    wherein the second pattern is formed by swapping positions at which the first reference signal and second reference signal are mapped in the first RB according to the first pattern.

2. The method of claim 1, wherein the first RB and the second RB each include 18 contiguous subcarriers.

3. The method of claim 1, wherein the first RB and the second RB each include five, six or seven symbols.

4. The method of claim 3, wherein the first symbol and the second symbol are contiguous in a time domain.

5. The method of claim 1, wherein the first pattern is configured in one subcarrier in the first RB.

6. The method of claim 5, wherein the second pattern is configured in one subcarrier in the second RB.

7. An apparatus in a wireless communication system, the apparatus comprising:
    a radio frequency unit configured for at least transmitting or receiving a radio signal; and
    a processor configured for:
    configuring a first pattern in both a first symbol and second symbol in a first resource block (RB);
    configuring a second pattern in both the first symbol and second symbol in a second RB, the second RB adjacent the first RB in a frequency domain;
    transmitting a first reference signal for a first layer, the first reference signal transmitted in the first symbol in the first RB according to the first pattern;
    transmitting a second reference signal for a second layer, the second reference signal transmitted in the second symbol in the first RB according to the first pattern;
    transmitting the first reference signal in the second symbol in the second RB according to the second pattern; and
    transmitting the second reference signal in the first symbol in the second RB according to the second pattern,
    wherein the second pattern is formed by swapping positions at which the first reference signal and second reference signal are mapped in the first RB according to the first pattern.

8. The apparatus of claim 7, wherein the first RB and the second RB each include 18 contiguous subcarriers.

9. The apparatus of claim 7, wherein the first RB and the second RB each include five, six or seven symbols.

10. The apparatus of claim 7, wherein the first symbol and the second symbol are contiguous in a time domain.

11. The apparatus of claim 7, wherein the first pattern is configured in one subcarrier in the first RB.

12. The apparatus of claim 7, wherein the second pattern is configured in one subcarrier in the second RB.

* * * * *